United States Patent [19]

Klimowicz

[11] 4,416,574
[45] * Nov. 22, 1983

[54] MULTIPLE PIECE BOLT-TYPE FASTENER

[76] Inventor: Jerome R. Klimowicz, 3827 W. LeGrande Blvd., 103N, Mequon, Wis. 53092

[*] Notice: The portion of the term of this patent subsequent to May 12, 1998 has been disclaimed.

[21] Appl. No.: 218,366

[22] Filed: Dec. 19, 1980

Related U.S. Application Data

[63] Continuation-in-part of Ser. No. 47,268, Jun. 11, 1979, Pat. No. 4,266,460.

[51] Int. Cl.³ .................. F16B 39/04; F16B 35/00
[52] U.S. Cl. ................................ 411/397; 411/200
[58] Field of Search ............. 411/396, 397, 383, 378, 411/200, 209, 210, 211, 294, 295, 429, 427; 10/27 R

[56] References Cited

U.S. PATENT DOCUMENTS

| | | | |
|---|---|---|---|
| 291,039 | 1/1884 | Edgell | 411/209 |
| 388,007 | 8/1888 | Whitney | 411/397 |
| 840,249 | 1/1907 | Patton | 411/320 |
| 2,810,139 | 10/1957 | Plagemann | 411/397 X |
| 3,468,211 | 9/1969 | Suan | 411/397 |
| 4,266,460 | 5/1981 | Klimowicz | 411/397 |

FOREIGN PATENT DOCUMENTS

| | | | |
|---|---|---|---|
| 756524 | 9/1933 | France | 411/397 |
| 170803 | 11/1921 | United Kingdom | 411/396 |
| 388263 | 2/1933 | United Kingdom | 411/396 |
| 524932 | 11/1976 | U.S.S.R. | 411/396 |

Primary Examiner—Ramon S. Britts
Attorney, Agent, or Firm—Andrus, Sceales, Starke & Sawall

[57] ABSTRACT

A bolt is fabricated from an elongated threaded rod by severing the rod along a planar surface angularly oriented with respect to a longitudinal axial plane through the rod. A cup-shaped nut has three equicircumferentially spaced lateral locking openings in the side walls adjacent the outer base wall thereof. The cup-shaped nut has an axial length greater than twice the diameter of the opening, with the opening in the half of the nut including the base wall. The nut is threaded onto the severed end of the rod with the base wall abutting the end of the rod. At least one locking opening is exposed to the inclined planar surface, and a pin is forced into the exposed opening with the inner end of the pin terminating within the nut and located immediately adjacent to the inclined surface thereby affecting a positive interconnection of the nut to the rod.

6 Claims, 4 Drawing Figures

MULTIPLE PIECE BOLT-TYPE FASTENER

BACKGROUND OF THE INVENTION

This application is a continuation-in-part of my application entitled "Multiple Piece Bolt-Type Fastener" and filed on June 11, 1979, with Ser. No. 6/047,268, now U.S. Pat. No. 4,266,460.

This invention relates to a multiple bolt-type fastener and to the method of fabrication of such a fastener.

Bolt-type fasteners having a threaded shank and an integral head are widely used for interconnection and fastening of elements to each other. A twist or turning force is, of course, applied to the head for insertion and removal of the fastener. Fastening bolts are manufactured in many different lengths, but generally only the shorter length bolts are immediately available. Although certain suppliers may stock various long sizes of particular bolts, longer bolts are not generally and conveniently available on demand, particularly for the small user such as the retail purchaser.

The prior art includes suggestions for forming a bolt-type fastener from a elongated threaded rod, which is generally available in lengths substantially greater than three inches, as more fully discussed in the above co-pending application of the present inventor. As more fully disclosed therein, a bolt may be advantageously formed by cutting a threaded rod member to a desired length, with the cut end formed as a plane surface which is angularly oriented with respect to a longitudinal axial plane. A cup-shaped nut having aligned and opposed openings in the opposite side walls adjacent the outer base thereof is threaded onto the severed end of the rod. The nut may be positioned with the openings extending across the inclined surface adjacent the outer end of the rod. A locking pin is forced into at least one of the openings to firmly and fixedly interconnect the pin in place. The pin is located within the head immediately adjacent to the inclined surface of the rod thereby affecting a positive interconnection of the head to the rod and completing the fastener bolt.

SUMMARY OF THE PRESENT INVENTION

The present invention is particularly directed to an improvement in the multiple piece bolt-type fastener having a rod or shank with the formed offset end and a threaded drive head pinned through a lateral head opening to such end, and particularly to a specially formed drive head to form a high strength assembly with the base wall abutting the end of the rod. In accordance with the present invention a cup-shaped nut or drive head includes at least three circumferentially spaced locking openings in the side wall of the drive head and located in a radial plane adjacent the outer base wall thereof. The head is formed of a constant thickness body for an axial length which is substantially longer than that of the locking opening, such that the drive head body extends from the openings onto the rod. In a preferred embodiment, three equicircumferentially spaced openings are provided such that with the head fully threaded onto the severed end of the rod or shank and with the base wall abutting the end of the rod, one of the locking openings opens into the chamber between the inclined end of the shank and the cup-shaped head. A pin is forced into the exposed opening engaging the inclined surface of the rod, thereby affecting a positive interconnection of the head to the rod and completing the fastener bolt. The combination of the enlarged head and at least three locking openings establishes a high strength connection of the head to the shank in a simple, economical and practical construction.

DESCRIPTION OF THE DRAWING FIGURES

The drawing furnished herewith generally illustrates the best mode presently contemplated for the invention and is described hereinafter.

DESCRIPTION OF ILLUSTRATED EMBODIMENT

Figure 1:
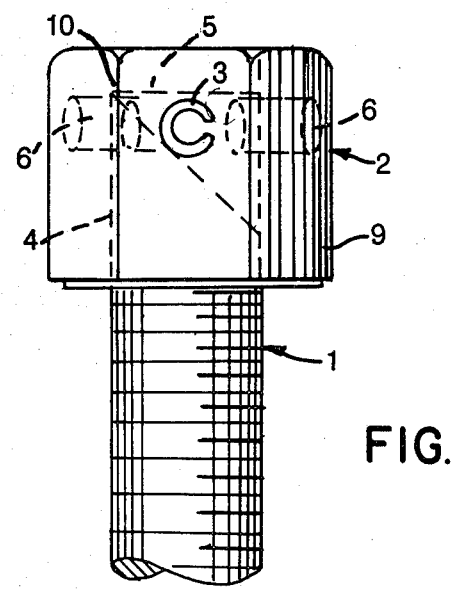
FIG. 1 is an elevational view of a bolt constructed in accordance with the present invention.
Figure 2:
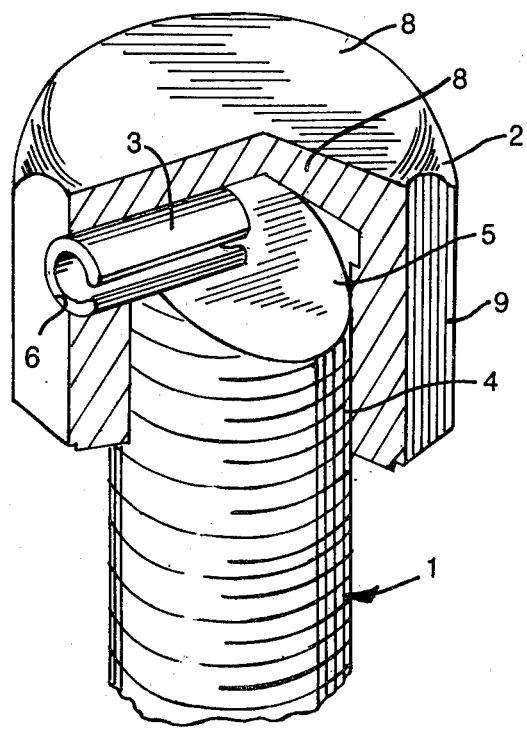
FIG. 2 is a pictorial view of the bolt shown in FIG. 1 with parts broken away and sectioned to show detail of construction.

Referring to the drawings and particularly to FIG. 1, a bolt unit is illustrated including a shank 1 to which an outer cup-shaped drive head or nut 2 is firmly interconnected by a laterally extending pin 3, generally as shown in the inventor's above identified application. As most clearly shown in FIGS. 2 and 3, shank 1 is threaded into the nut 2 as at 4. The innermost end of the shank 1 is provided with an inclined end face or surface 5 within nut 2 and a pin 3 extends into the side of nut 2 and terminates within the nut 2 across the inclined surface. The nut 2 is, however, uniquely formed with an extended body portion 9 which extends onto the shank 1 substantially beyond the pin 3. Further, nut 2 is formed with at least three locking openings 6, and which are equicircumferentially spaced. Each opening 6 is adapted to receive the locking pin 3. Applying a turning force to the nut 2 in one direction causes the nut 2 to tighten onto the shank 1 thereby providing a first interconnection therebetween. Rotation forces applied in an appropriate or loosening direction to the nut 2 is transmitted by the locking pin 3 into engagement with the inclined surface 5 of the rod and thereby transmits the forces in the same manner as if the head were rigidly or integrally interconnected and fixed to the rod.

More particularly, in the fabrication of a bolt unit as shown in FIG. 1, the shank 1 is formed from a suitable and corresponding threaded rod of indefinite length. The rod may be any standard threaded rod such as available in a hardware store, a distributor of industrial products and the like. Relatively long threaded rods are readily available of a conventional material, and may be available or formed of special materials. After the separate formation of the rod and the nut, and bolt length is determined. The threaded rod is cut along an inclined plane, thereby forming and defining the end clamp surface 5.

Figure 4:
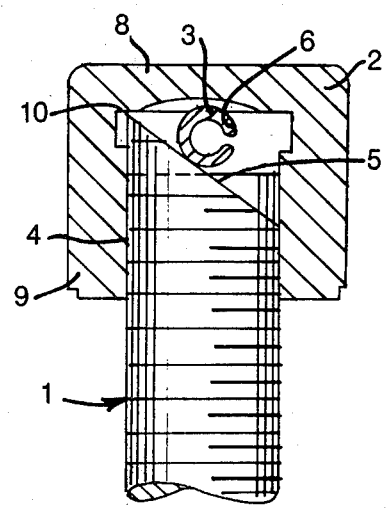
FIG. 4 is a side elevational view of the fabricated bolt shown in FIG. 1, with parts broken away and sectioned.

The nut 2 is illustrated as a cup-shaped member having a closed outer end or base wall 8 which may be continuous, formed with a central socket or the like and an internally threaded annular body or side wall 9 of a substantially constant thickness throughout the complete length of the nut. The internal threads of the nut 2 correspond to the external threads of rod. The nut 2 is formed with an undercut portion adjacent the base wall 8, as most clearly shown in FIG. 4, to permit a full threaded engagement of the shank with the nut, and the bottom of the shank on the base. In accordance with the present invention, the cup-shaped member 2 is formed with the tubular body 9 having an axial length substantially greater than the axial length of the openings and of a substantially constant thickness, as most clearly shown in FIG. 4. The pin receiving locking openings 6 are equicircumferentially spaced within the side wall 9 immediately inwardly of the base wall 8 and thus in the outer portion of the nut body 9 adjacent the base wall. The length of the nut 2 and particularly body 9 thus is at least twice the axial length of the clamping opening 6 and associated pin 3, and thus extends substantially onto the shank 1 beyond the locking openings 6 and the inclined end 5. The openings 6 may be readily formed in the fabrication of nut 2, or subsequently, formed in an existing head such as by use of a conventional drill.

The nut 2, as rod 1, may be formed of a conventional nut and bolt steel with the enlarged nut body maintaining a strength provided by the conventional bolt. After appropriately cutting of the rod and providing of an appropriate nut 2, the nut 2 is threaded onto the rod 1 until the base wall 8 abutts the end 5 of rod 2, as at 10. The three openings 6 extending across and immediately adjacent the removed end portion of the rod 1 ensures that at least one opening 6 is exposed to the chamber formed between the rod end 5 and the base of the opening of the nut 2. The pin 3, which is preferably a conventional split roll-pin, may therefore be and is inserted into the exposed opening using any suitable tool such as a hammer, a pressure forcing clamp or the like with the rod 1 abutting the nut 2. The pin 3 need only be inserted approximately ⅓ to ½ of the maximum length into the head or nut 2.

The pin 3 may also be provided with a slight taper to accommodate ease of assembly. The pin 3 moves through opening 6 and is aligned over the inclined end 5 of rod. The pin 3 preferably is formed to establish a firm press fit to maintain the desired fixed interconnection, while providing a simple and inexpensive method of assembly.

Figure 3:
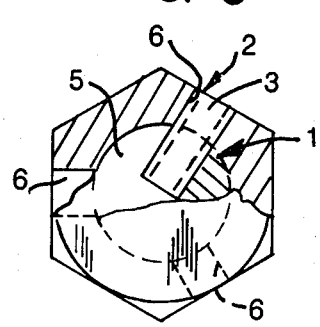
FIG. 3 is a top view of the bolt with parts broken away and sectioned.

Although shown with a single pin, the multiplicity of circumferentially spaced openings provides the availability of using a second pin in the second exposed opening, such as shown in FIG. 3. A second pin may be desirable to even more positively lock the head to the shank.

As a result of the enlarged nut structure and the multiple and equicircumferentially spaced locking openings, the nut may be formed of conventional bolt and nut steel and maintain the pulling or tensile strength and the turning strength of the usual integral bolt. The turning forces, in both directions on the head 2 of the finished bolt is thus transferred to the shank 1 in accordance with conventional practice.

Various modes of carrying out the invention are contemplated as being within the scope of the following claims particularly pointing out and distinctly claiming the subject matter which is regarded as the invention.

I claim:

1. A bolt-type fastening unit, comprising a threaded shank having an offset end surface defining a generally inclined end surface, a cup-shaped drive head having a base wall and a threaded axial opening from the base to substantially the entrance to said axial opening, said head being threaded onto said shank and establishing a chamber within the head and the end of the shank, said head having at least three lateral and circumferentially spaced openings through the side wall spaced from the entrance to said cup-shaped head, said openings being non-parallel whereby the exterior of said three openings into said chamber intersect within said chamber establishing at least one of said openings fully communicating with said chamber, and an interlocking means fixedly extending through said opening into overlying engagement with said offset end surface to interlock the head to the shank and transmit the turning force applied to the head to the shank, said cup-shaped head having an axial depth of an essentially constant thickness at least greater than twice the axial length of said locking openings whereby the portion of the head extending from said opening onto said shank is at least equal to the portion inclusive of said opening.

2. The fastening unit of claim 1 wherein said interlocking means includes a rigid pin element fixedly secured in said opening and extending into overlying engagement with said offset end.

3. The fastening unit of claim 1 wherein said locking openings include three equicircumferentially spaced openings.

4. A bolt-type fastening unit, comprising a threaded shank having an inclined planar end surface extended completely across said shank, a drive nut having a base wall and a threaded axial opening from the base to substantially the entrance to said axial opening, having an outer periphery with flats adapted to receive a turning tool means, said nut being fully threaded onto said shank with said base wall abutting said shank, said nut having three equicircumferentially spaced side wall openings spaced located immediately adjacent the base wall and spaced from the axially outermost entrance end by a distance greater than the diameter of the openings, at least one of said openings extending across and outwardly of said planar surface with said base wall of said nut abutting said shank, and an interlocking pin fixedly extending through said one exposed openings and terminating within the nut in overlying engagement with said planar end surface.

5. A cup-shaped nut adapted to be secured to a threaded shank having an inclined planar end surface, said nut comprising a tubular body having an end base wall and an interior threaded axial opening from the base wall, said nut having three equicircumferentially spaced side wall openings located immediately adjacent the base wall and spaced from the axially outermost entrance end of said threaded opening by a distance greater than the diameter of the openings, at least one of said openings thereby being adapted across and outwardly of said planar end surface with said base wall of said nut abutting the end of said shank, and said opening adapted to receive an interlocking pin extending therefrom and terminating within the nut in overlying engagement with said planar end surface for locking the nut to said shank.

6. The cup-shaped nut of claim 5 wherein said drive nut includes outer peripheral flats adapted to receive a turning tool means.

* * * * *